United States Patent
Oh et al.

(10) Patent No.: US 10,593,933 B2
(45) Date of Patent: Mar. 17, 2020

(54) NEGATIVE ELECTRODE ACTIVE MATERIAL FOR NON-AQUEOUS ELECTROLYTE RECHARGEABLE BATTERY, METHOD FOR PREPARING SAME, AND NON-AQUEOUS RECHARGEABLE BATTERY INCLUDING SAME

(71) Applicant: DAEJOO ELECTRONIC MATERIALS CO., LTD., Siheung-si, Gyeonggi-do (KR)

(72) Inventors: Seung Min Oh, Siheung-si (KR); Ki Young Kim, Siheung-si (KR)

(73) Assignee: DAEJOO ELECTRONIC MATERIALS CO., LTD., Gyeonggi-do (KR)

(*) Notice: Subject to any disclaimer, the term of this patent is extended or adjusted under 35 U.S.C. 154(b) by 0 days.

(21) Appl. No.: 14/917,230

(22) PCT Filed: Jan. 15, 2016

(86) PCT No.: PCT/KR2016/000443
§ 371 (c)(1),
(2) Date: Mar. 7, 2016

(87) PCT Pub. No.: WO2016/204366
PCT Pub. Date: Dec. 22, 2016

(65) Prior Publication Data
US 2018/0090750 A1 Mar. 29, 2018

(30) Foreign Application Priority Data
Jun. 15, 2015 (KR) .................. 10-2015-0084515

(51) Int. Cl.
| | |
|---|---|
| *H01M 4/36* | (2006.01) |
| *H01M 4/133* | (2010.01) |
| *H01M 4/1395* | (2010.01) |
| *H01M 4/1397* | (2010.01) |
| *H01M 4/38* | (2006.01) |
| *H01M 4/48* | (2010.01) |
| *H01M 4/58* | (2010.01) |
| *H01M 4/62* | (2006.01) |
| *H01M 10/0525* | (2010.01) |
| *H01M 4/02* | (2006.01) |

(52) U.S. Cl.
CPC ........... *H01M 4/364* (2013.01); *H01M 4/133* (2013.01); *H01M 4/1395* (2013.01); *H01M 4/1397* (2013.01); *H01M 4/366* (2013.01); *H01M 4/386* (2013.01); *H01M 4/483* (2013.01); *H01M 4/5825* (2013.01); *H01M 4/625* (2013.01); *H01M 10/0525* (2013.01); *H01M 2004/027* (2013.01); *Y02T 10/7011* (2013.01)

(58) Field of Classification Search
CPC ....... H01M 10/0525; H01M 2004/027; H01M 4/1395; H01M 4/1397; H01M 4/364; H01M 4/366; H01M 4/386; H01M 4/483; H01M 4/5825; H01M 4/625
See application file for complete search history.

(56) References Cited

U.S. PATENT DOCUMENTS

2013/0337314 A1* 12/2013 Essaki .................. H01M 4/134
429/163

FOREIGN PATENT DOCUMENTS

JP 2010170943 A * 8/2010 .............. H01M 4/36

OTHER PUBLICATIONS

Machine Translation JP2010170943(A) (Year: 2010).*

* cited by examiner

*Primary Examiner* — Miriam Stagg
*Assistant Examiner* — Victoria H Lynch
(74) *Attorney, Agent, or Firm* — Kelly & Kelley, LLP (57) ABSTRACT

Provided are a negative electrode active material for a non-aqueous electrolyte rechargeable battery, a method for preparing the same, and a non-aqueous electrolyte rechargeable battery including the same and, more specifically, a negative electrode active material for a non-aqueous electrolyte rechargeable battery, including a silicon oxide composite, capable of degrading irreversible characteristics and improving structural stability of the non-aqueous electrolyte rechargeable battery, the silicon oxide composite containing silicone, a silicon oxide represented by general formula $SiO_x$ (0<x<2), and an oxide including silicone and M (M is any one element selected from the group consisting of Mg, Li, Na, K, Ca, Sr, Ba, Ti, Zr, B, and Al), a method for preparing the same, and to a non-aqueous electrolyte rechargeable battery including the same.

9 Claims, 3 Drawing Sheets

FIG. 3

NEGATIVE ELECTRODE ACTIVE MATERIAL FOR NON-AQUEOUS ELECTROLYTE RECHARGEABLE BATTERY, METHOD FOR PREPARING SAME, AND NON-AQUEOUS RECHARGEABLE BATTERY INCLUDING SAME

FIELD OF THE INVENTION

The present invention relates to a negative electrode active material for a non-aqueous electrolyte rechargeable battery, a method for preparing the same, and a non-aqueous electrolyte rechargeable battery including the same and, more specifically, to a negative electrode active material for a non-aqueous electrolyte rechargeable battery, including a silicon oxide composite, capable of degrading irreversible characteristics and improving structural stability of the non-aqueous electrolyte rechargeable battery, the silicon oxide composite containing i) silicone, ii) a silicon oxide represented by general formula $SiO_x$ (0<x<2), and iii) an oxide including silicone and M (M is any one element selected from the group consisting of Mg, Li, Na, K, Ca, Sr, Ba, Ti, Zr, B, and Al), to a method for preparing the same, and to a non-aqueous electrolyte rechargeable battery including the same.

BACKGROUND OF THE INVENTION

Related Art

Lithium, which is a negative electrode active material for a non-aqueous electrolyte battery, has been an object of attention from many researchers and has been widely used in primary batteries, due to its high voltage, high-energy density, and small self-discharging. However, the application of a lithium metal as a negative electrode active material for a non-aqueous electrolyte rechargeable battery causes a dendrite phenomenon or irreversible materials in a negative electrode at the time of charge and discharge, resulting in problems, such as the decline in the charge and discharge efficiency and the decrease in the cycle life.

In order to solve the problems, there is applied a method of inducing an oxidation-reduction reaction while absorbing and desorbing lithium ions in a layered crystal structure, by applying a material, such as carbon, obtained by sintering graphite or an organic material. That is, graphite and carbon-based negative electrode active materials lead to a superior charge and discharge efficiency and an excellent cycle life, compared with a metal-based negative electrode, and thus has been widely commercialized compared with the metal-based negative electrode.

Meanwhile, portable electronic communication devices or gearing tools gradually have smaller sizes, lighter weights, and higher functions, and the need of high capacity for commercialization of electric cars becomes stronger, but the carbon-based material has a limitation in achieving high capacity of non-aqueous electrolyte rechargeable batteries due to a low battery capacity resulting from its structural characteristics.

Hence, recently, in spite of several problems involved in metal negative electrodes, studies on metals, such as Si and Sn, are again being actively carried out. Especially, silicon-based negative electrodes are being very actively studied since the theoretical capacity of the silicon-based negative electrodes is 4,200 mAh/g, which is at least 10-fold higher than the theoretical capacity of carbon-based negative electrodes, 370 m Ah/g.

Silicon, as a negative electrode active material, expands to a volume of 300% or more due to a reaction with lithium at the time of charge, and then contracts at the time of discharge, and this rapid expansion and contraction may cause problems in that particles of the negative electrode active material may crack and electrodes may drop off, ultimately resulting in a fatal problem in that the cycle life rapidly decreases.

In order to solve these problems, there are proposed techniques for performing a process for mechanically milling silicon and carbon, compounding silicon and carbon by chemical deposition, or applying a silicon oxide, which has a relatively lower volume expansion rate than metal silicon, as a negative electrode active material.

In this regard, there was proposed a method of coating a carbon layer on a surface of silicon particles using chemical vapor deposition (CVD) (Patent Document: JP 4393610). However, in spite of an advantage of improving conductivity due to the surface carbon layer, the merely suppression of a volume change involved in charge and discharge, which is the main problem of the silicon-based negative electrode, could still not effectively prevent the decrease in the cycle life. Whereas, silicon oxide receives attention as a material which induces a smaller capacity than silicon but a very excellent capacity compared with carbon-based negative electrodes, and has a lower volume expansion rate than metals, and thus excellent cycle life characteristics.

With respect to silicon oxide, represented by general formula $SiO_x$, the ratio between the numbers of silicon atoms and oxygen atoms is generally close to 1:1, and silicon ultrafine crystals are distributed in the silicon oxide. Silicon crystals with a size of several nanometers or more can be clearly observed by transmission electron microscopy and X-ray diffraction analysis.

This silicon oxide ($SiO_x$) is decomposed into Si and $SiO_2$ by disproportionation at a high temperature of 1000° C. or higher, to form a structure in which several nm-sized silicon crystals are uniformly distributed. This silicon oxide, when applied as a negative electrode active material for a rechargeable battery, includes the capacity, which is nearly half the capacity in a silicon negative electrode active material but about 5 times compared with the capacity in the carbon-based negative electrode active material, and the silicon oxide is expected to have excellent cycle life characteristics since the volume change thereof at the time of charge and discharge is small due to the structural reason.

However, the silicon oxide generates lithium silicide and lithium oxides (lithium oxide and lithium silicate) through a reaction of lithium and silicon oxide at the time of initial charge, and here, the lithium oxides are not involved in subsequent electrochemical reactions, leading to an irreversible reaction in which some lithium moved to a negative electrode at the time of initial charge does not come back to a positive electrode at the time of discharge. The irreversible capacity of the silicon oxide is larger compared with the other silicon-based negative electrodes, and thus the initial efficiency, a ratio of discharge capacity to charge capacity at the initial time) thereof is 70-75%, very low. This low initial efficiency requires excessive capacity of the positive electrode to configure a rechargeable battery, resulting in offsetting the capacity per unit mass of the negative electrode.

In order to solve the initial charge and discharge efficiency, which is one of the greatest problems of the silicon oxide negative electrode, studies about a method of supplementing reversible capacity by adding lithium to the negative electrode in advance or reducing the oxygen content in $SiO_x$, or a method for reducing reversible lithium oxide generating reactions, are being actively conducted.

For the supplementation of the reversible capacity, a method of attaching a lithium foil to a surface of a negative electrode active material (Patent Document: Japanese Patent Publication No. H11-086847) and a method for depositing lithium on a surface of a negative electrode active material (Patent Document: JP 4876531) have been reported, but these methods have a limitation in commercialization due to a high-priced lithium source, a very complicated manufacturing process, and safety in the handling.

In addition, a method of reducing the oxygen content in $SiO_x$ by adding a silicon powder to $SiO_x$ (Patent Document: JP 3892230), and a method of obtaining a mixture solid of silicon and $SiO_x$ by simultaneously generating and precipitating a silicon vapor in the $SiO_x$ preparing step (Patent Document: Japanese Patent Publication No. 2007-290919) have been reported. However, although silicon has higher initial charge and discharge efficiency and capacity, compared with $SiO_x$, silicon exhibits a volume expansion rate of at least 300% at the time of charge, and thus the degree of the volume expansion of $SiO_x$ is difficult to control even when silicon is added to $SiO_x$ and a carbon material. In addition, silicon has a limitation in commercialization since a high temperature of 2,000° C. or higher is needed due to a low vapor pressure of silicone in order to generate silicon and $SiO_x$ vapor at the same time and obtain a mixture thereof.

In order to suppress the generation of lithium oxides, which are the causes of initial irreversibility at the time of charge and discharge for a rechargeable battery, there are a method of allowing $SiO_x$ to react with lithium hydroxide to be fused into SiLixOy (0<x<1.0, 0<y<1.5), some of which is crystallized (Patent Document: JP 4702510) and a method of allowing $SiO_x$ to react with a metal lithium powder to prepare a silicon-silicon oxide-lithium based composite (Patent Document: JP 4985949). These methods improve the initial efficiency of the non-aqueous electrolyte rechargeable battery, but have problems in that the battery capacity is reduced, the stability of the paste deteriorates when an electrode is manufactured by using polyimide (PI) as a binder, the reactive heat and reaction rate are difficult to control through the use of a lithium source, and the cost of the source is increased, resulting in difficulty in industrial production.

In order to solve the problem caused by the reduction in the lithium oxide generating reaction causing irreversibility, there has been reported a method of preparing a magnesium- or calcium-doped silicon-silicon oxide composite while delaying the reaction rate, by coating a surface of the silicon-silicon oxide composite with carbon, followed by reaction with magnesium hydride ($MgH_2$) or calcium hydride ($CaH_2$). This method leaded to a stabilization in the electrode paste, an improvement in life characteristics, and an increase in the initial charge and discharge efficiency to about 78% compared with $SiO_x$, but in cases where the magnesium content was increased in order to attain an initial efficiency of 80% or more, the size of silicon crystals was rapidly increased to several tens of nm or greater, and the discharging capacity and the life retention rate were rapidly decreased.

SUMMARY OF THE INVENTION

Technical Problem

Therefore, the present invention has been made to solve the above-mentioned problems, and an aspect of the present invention is to provide a negative electrode active material for a non-aqueous electrolyte rechargeable battery, a method for preparing the same, and a non-aqueous electrolyte rechargeable battery including the same, wherein the negative electrode active material contains a novel structure of silicon oxide composite for solving problems in that, when a metal is added to the negative electrode active material for a non-aqueous electrolyte rechargeable battery to suppress the generation of lithium oxides, which are the causes of irreversibility, in order to improve the initial charge and discharge efficiency of the non-aqueous electrolyte rechargeable battery, the initial efficiency is improved, but the discharging capacity is reduced, and the cycle life characteristics deteriorate due to an increase in the size of silicon crystals.

Technical Solution

In an aspect, there is provided a negative electrode active material for a non-aqueous electrolyte rechargeable battery, including a silicon oxide composite, the silicon oxide composite containing i) silicon, ii) a silicon oxide represented by general formula $SiO_x$ (0<x<2), and iii) an oxide including silicon and M, wherein the silicon oxide composite exhibits at least one diffraction peak in each of the ranges of 27° to 32° and 21° to 23.5°, in the X-ray diffraction analysis, and wherein M is any one element selected from the group consisting of Mg, Li, Na, K, Ca, Sr, Ba, Ti, Zr, B, and Al.

In an embodiment, M may be Mg.

In an embodiment, the oxide including silicon and M may be $Mg_2SiO_4$.

In an embodiment, in the X-ray diffraction analysis of the silicon oxide composite, the range of the relative ratio between the intensity of a diffraction peak belonging to Si (111), $I_{Si(111)}$, and the intensity of a diffraction peak belonging to $Mg_2SiO_4$ (120), $I_{Mg2SiO4(120)}$, may be $0<I_{Mg2SiO4(120)}/I_{Si(111)}<1.0$.

In an embodiment, the size of silicon crystals contained in the silicon oxide composite, which is determined by Scherrer equation on the basis of the full width at half maximum (FWHM) of the diffraction peak of Si (111) in the X-ray diffraction analysis, may be 1-50 nm.

In an embodiment, the average particle diameter ($D_{50}$) of the silicon oxide composite may be 0.1-20 μm.

In an embodiment, the specific surface area of the silicon oxide composite may be 1-50 $m^2/g$.

In an embodiment, the negative electrode active material may further include a coating layer or deposition layer containing a carbon-based material on a surface of the silicon oxide composite.

In an embodiment, the content of the carbon-based material may be 1-20 parts by weight on the basis of 100 parts by weight of the silicon oxide composite.

In another aspect, there is provided a lithium ion battery including the negative electrode active material for a non-aqueous electrolyte rechargeable battery.

In another aspect, there is provided a method for preparing the negative electrode active material for a non-aqueous electrolyte rechargeable battery, the method including: (i) simultaneously injecting a silicon oxide powder and M into a reactor, the silicon oxide powder being obtained by mixing silicon and silicon dioxide ($SiO_2$) powders to have a mole ratio of 1:0.5 to 1:1.5, the mole ratio of the silicon and M being 1:0.01 to 1:1; (ii) heating the silicon oxide powder and M at 1,000-1,800° C., followed by cooling at 500-900° C., to precipitate a silicon oxide composite; and (iii) pulverizing the precipitated silicon oxide composite to an average particle diameter of 0.1-20 µm), wherein M is any one element selected from the group consisting of Mg, Li, Na, K, Ca, Sr, Ba, Ti, Zr, B, and Al.

In an embodiment, in step (ii) of precipitating the silicon oxide composite, the heating may be conducted under a reduced pressure atmosphere of 0.01 to 1 torr.

In an embodiment, the method may further include, after step (iii) of pulverizing the silicon oxide composite, (iv) forming a coating layer or deposition layer containing a carbon-based material on a surface of the silicon oxide composite by injecting a carbon-based material source gas into the silicon oxide composite, followed by heating at 600-1,200° C. for 30 minutes to 8 hours.

In an embodiment, M may be Mg.

DESCRIPTION OF EXEMPLARY EMBODIMENTS

Hereinafter, the present invention will be described in detail with reference to examples. However, the present invention may be realized in various different forms, and therefore is not limited to examples to be described herein.

As described above, in the case of the negative electrode active material for a non-aqueous electrolyte rechargeable battery, including a silicon oxide composite surface-coated with carbon, which was prepared according to the prior art, the electrochemical reaction of lithium and silicon oxide ($SiO_x$) caused irreversible materials, such as lithium oxide ($LiO_2$) and lithium silicate ($Li_2SiO_3$, $Li_4SiO_4$), and for the prevention of this, a silicon oxide reduced by a reaction with a metal (Li, Na, Mg, Al, Ca, etc.) capable of reducing silicon oxide was used as a negative electrode active material to reduce the irreversible capacity and improve the efficiency in the non-aqueous electrolyte rechargeable battery. However, in the case where the silicon oxide ($SiO_x$) powder is allowed to react with the solid metal powder of Mg, Al, Ca, etc., as in the prior art, the silicon oxide ($SiO_x$) is reduced by the metal powder to suppress the generation of the irreversible materials, such as lithium oxide ($LiO_2$) and lithium silicate ($Li_2SiO_3$, $Li_4SiO_4$), thereby improving the initial charge and discharge efficiency, but the silicon oxide ($SiO_x$) reacts with the metal powders at a fast rate, resulting in a rapid disproportionation in which $SiO_x$ is decomposed into Si and $SiO_2$, and silicon crystals grow to have a size of several tens of nm, thereby excessively increasing the volume change at the time of charge and discharge, resulting in the deterioration in cycle life characteristics.

Therefore, the present inventors repeated experiments for preparing a negative electrode active material with improved capacity characteristics and cycle characteristics through a reaction of a silicon oxide ($SiO_x$) powder and a metal powder. As a result, a silicon oxide ($SiO_x$) vapor and a vapor of a metal capable of reducing the silicon oxide ($SiO_x$) vapor are simultaneously generated, and allowed to react with each other in a gas phase, thereby preparing a silicon oxide composite, of which silicon crystals are controlled to several nm levels and the battery capacity is retained through an efficient reaction of the added metal at a minimum content.

To this end, there can be provided a negative electrode active material for a non-aqueous electrolyte rechargeable battery, including a silicon oxide composite, the silicon oxide composite containing i) silicon, ii) a silicon oxide represented by general formula $SiO_x$ (0<x<2), and iii) an oxide including silicon and M, wherein the silicon oxide composite exhibits at least one diffraction peak in each of the ranges of 27° to 32° and 21° to 23.5°, in the X-ray diffraction analysis, and wherein M is any one element selected from the group consisting of Mg, Li, Na, K, Ca, Sr, Ba, Ti, Zr, B, and Al.

As used herein, the term "silicon oxide" refers to a general compound represented by $SiO_x$, and the silicon oxide may be amorphous or may have a structure in which silicon crystals are distributed in the silicon oxide, and preferably may have a structure in which silicon crystals are distributed in the silicon oxide.

In the silicon oxide composite of the present invention, M is not particularly limited so long as it can reduce the silicon oxide, but M may be an element belonging to groups I a, IIa, VIa, and IIIb on the periodic table of elements, preferably any one element selected from the group consisting of Mg, Li, Na, K, Ca, Sr, Ba, Ti, Zr, B, and Al, more preferably Mg, Ca, or Al, and still more preferably Mg. The oxide including the silicon and M may be $Mg_2SiO_4$.

In the X-ray diffraction analysis of the silicon oxide composite of the present invention, the range of the relative ratio between the intensity of a diffraction peak belonging to Si (111), $I_{Si(111)}$, and the intensity of a diffraction peak belonging to $Mg_2SiO_4$ (120), $I_{Mg2SiO4(120)}$, is $0 < I_{Mg2SiO4(120)}/I_{Si(111)} < 1.0$. If the range of the relative ratio between an intensity of a diffraction peak belonging to Si (111), $I_{Si(111)}$, and the intensity of a diffraction peak belonging to $Mg_2SiO_4$ (120) $I_{Mg2SiO4(120)}$, is 0, the addition amount of Mg is severely small, such that the diffraction peak belonging to $Mg_2SiO_4$ (120) is not observed, and the effect by the addition of Mg is not shown. Meanwhile, if the range of the relative ratio between an intensity of a diffraction peak belonging to Si (111), $I_{Si(111)}$, and the intensity of a diffraction peak belonging to $Mg_2SiO_4$ (120) $I_{Mg2SiO4(120)}$, is greater than 1, the size of the Si crystals is smaller than 1 nm, the silicon oxide composite is amorphous or the Si content is severely small, causing decreased efficiency and reduced capacity.

In the silicon oxide composite of the present invention, the size of the silicon crystals contained in the silicon oxide composite, which is determined by Scherrer equation on the basis of the full width at half maximum (FWHM) of the diffraction peak of Si (111) in the X-ray diffraction analysis, may be 1-50 nm, and preferably 3-30 nm.

The sizes of silicon crystals may be differently shown depending on the concentration of Mg and the precipitation temperature of the reaction material, and the size of the silicon crystals may be determined by Scherrer equation expressed by general formula (1) below on the basis of the full width at half maximum (FWHM) of the diffraction peak of Si (111) in the X-ray diffraction analysis.

$$C.S.[\text{nm}] = K \cdot \lambda / B \cdot \cos \theta \qquad \text{general formula (1)}$$

(In general formula (1) above, K=0.9, λ=0.154 nm, B=full width at half maximum (FWHM, rad), θ=peak position (angle))

Silicon crystals with a size of smaller than 1 nm may result in a rapid reduction in the charge and discharge efficiency of the battery, and silicon crystals with a size of greater than 50 nm may result in reductions in capacity characteristics and cycle characteristics of the battery.

In the silicon oxide composite of the present invention, the average particle diameter ($D_{50}$) of the silicon oxide composite powder may be 0.1-20 μm, and preferably 0.5-15 μm.

The average particle diameter of the silicon oxide composite powder may be a measurement value by weight average value $D_{50}$ (particle diameter or median diameter until the accumulative weight reaches 50% of the total weight) in the particle size distribution measurement by laser light diffraction. If the average particle diameter ($D_{50}$) of the silicon oxide composite is smaller than 0.1 μm, the specific surface area of the silicon oxide composite increases, and thus, at the time of preparing a slurry for a rechargeable battery electrode, the uniform mixing may be difficult, resulting in a non-uniform distribution of the negative electrode active material, and at the time of manufacturing an electrode, the consumption amount of the necessary binder is increased, resulting in a reduction in the efficiency in the negative electrode manufacturing process, and the charge and discharge capacity per unit volume may be decreased. Meanwhile, if the average particle diameter ($D_{50}$) of the silicon oxide composite is greater than 20 μm, the manufacturing of an electrode film may be difficult, and the powder may be easily separated from a current collector due to the volume expansion of the silicon at the time of charge and discharge.

The silicon oxide composite of the present invention may have a specific surface area of 1-50 $m^2/g$. A silicon oxide composite with a specific surface area of smaller than 1 $m^2/g$ may lead to a non-uniform electrode film in a coating process after the slurry is prepared, and whereas, a silicon oxide composite with a specific surface area of greater than 50 $m^2/g$ may cause many side reactions in the battery at the time of charge and discharge, resulting in a deterioration in battery characteristics.

A coating layer or deposition layer containing a carbon-based material may be formed on a surface of the silicon oxide composite of the present invention. Since the application of the silicon-based material as a negative electrode active material for a non-aqueous electrolyte rechargeable battery may cause an increase in electrical resistance, the silicon-based material may be surface-coated with carbon to improve conductivity.

The kind of carbon-based material is not particularly limited, but the carbon-based material in the mixture may include graphite-based materials, such as natural graphite, artificial graphite, and expanded graphite, carbon black-based materials, such as acetylene black and ketjen black, and carbon fiber-based materials; the carbon-based material in the coating layer or deposition layer on the surface of the silicon oxide composite may include hydrocarbon-based materials, such as methane, ethane, ethylene, propane, butane, acetylene, carbon monoxide, benzene, toluene, and xylene. Preferably, the carbon-based material may be in the coating layer or deposition layer formed on the surface of the silicon oxide composite in view of the fact that the carbon-based materials can increase the conductivity of the negative electrode active material.

The content of the carbon-based material may be 1-20 parts by weight, and preferably 1-10 parts by weight on the basis of 100 parts by weight of the silicon oxide composite of the present invention.

If the content of the carbon-based material is less than 1 part by weight on the basis of 100 parts by weight of the silicon oxide composite, the improvement in conductivity of the electrode, and charge and discharge characteristics of the battery, and cycle characteristics cannot be obtained, and whereas if the content of the carbon-based material is more than 20 parts by weight, there may not be problematic in view of conductivity of the electrode, charge and discharge characteristics of the battery, and cycle characteristics, but the specific surface area of the electrode increases, the preparing of the electrode slurry may be difficult or the battery capacity may be reduced.

To this end, there is provided a method for preparing the negative electrode active material for a non-aqueous electrolyte rechargeable battery, the method including: (i) simultaneously injecting a silicon oxide powder and M into a reactor, the silicon oxide powder being obtained by mixing silicon and silicon dioxide ($SiO_2$) powders to have a mole ratio of 1:0.5 to 1:1.5, the mole ratio of the silicon and M being 1:0.01 to 1:1;

(ii) heating the silicon oxide powder and M at 1,000-1,800° C., followed by cooling at 500-900° C., to precipitate a silicon oxide composite; and (iii) pulverizing the precipitated silicon oxide composite to an average particle diameter of 0.1-20 μm, wherein M is any one element selected from the group consisting of Mg, Li, Na, K, Ca, Sr, Ba, Ti, Zr, B, and Al.

In step (i) of preparing the silicon oxide mixture powder, M is not particularly limited so long as it can reduce the silicon oxide, but M may be any one element selected from the group consisting of Mg, Li, Na, K, Ca, Sr, Ba, Ti, Zr, B, and Al, preferably Mg, Ca, or Al, and more preferably Mg.

In step (ii) of precipitating the silicon oxide composite, the silicon oxide composite may be obtained by allowing gas-phase silicon oxide ($SiO_x$) to react with gas-phase M, preferably Mg, followed by cooling and precipitation.

If the temperature for heating the silicon oxide mixture powder is lower than 1,000° C., it may be difficult to improve the initial efficiency through heat treatment, and if the temperature is higher than 1,800° C., the silicon crystals excessively grow, and causes cracks in a structure of the silicon oxide composite by volume expansion and contraction of silicon crystals due to the absorption of lithium ions, resulting in a deterioration in cycle characteristics.

The gas-phase silicon oxide ($SiO_x$) and the gas-phase M of the present invention may be formed by a heating process under a reduced pressure atmosphere of 0.001-1 torr.

After the silicon oxide mixture powder is heated, the temperature for precipitating the silicon oxide composite through cooling is 500-900° C. If the temperature for precipitating the silicon oxide composite through cooling is lower than 500° C., the silicon oxide and the M react with each other in a gas phase and then are rapidly cooled, thereby generating a nanopowder, and thus the specific surface area of the silicon oxide composite is rapidly increased, resulting in a deterioration in battery characteristics. If the temperature is higher than 900° C., the size of the silicon crystals is increased to several tens of nm or greater, and thus the life characteristics of the battery may rapidly deteriorate.

The method for preparing a negative electrode active material for a non-aqueous electrolyte rechargeable battery, may further include, after step (iii) of pulverizing the silicon oxide composite, step (iv) of forming a coating layer or deposition layer containing a carbon-based material on a surface of the silicon oxide composite by injecting a carbon-based material source gas into the silicon oxide composite, followed by heating at 600-1,200° C. for 30 minutes to 8 hours.

The forming of a coating layer or deposition layer containing a carbon-based material on the surface of the silicon oxide composite is not particularly limited, but the coating layer or deposition layer containing a carbon-based material may be formed by forming an organic polymer film on the surface of the silicon oxide composite and then thermally decomposing the organic polymer film in the inactive atmosphere, or thermally treating a hydrocarbon or organic gas and using a chemical vapor deposition method, and preferably by using the chemical vapor deposition method.

If the temperature for the chemical vapor deposition method is lower than 600° C., the carbon-based material may not be formed or extremely slowly generated, resulting in a deterioration in productivity, and if the temperature is higher than 1,200° C., the decomposition of the source gas is promoted and thus the carbon-based material may not be well formed.

For the carbon-based source gas, hydrocarbon-based materials, such as benzene, toluene, xylene, methane, ethane, ethylene, propane, butane, acetylene, and carbon monoxide, may be used, and cheaper liquefied petroleum gas (LPG) or liquefied natural gas (LNG) may be used.

The carbon-based material formed on the surface of the silicon oxide composite may include any one or a combination, selected from crystalline carbon, amorphous carbon, carbon fiber, carbon whisker, carbon nanofiber, carbon nanotube, graphene, graphene oxide, and reduced graphene oxide.

In addition, the present invention may provide: a negative electrode for a non-aqueous electrolyte rechargeable battery, containing the above-described negative electrode active material for a non-aqueous electrolyte rechargeable battery; and a non-aqueous electrolyte rechargeable battery including the same.

The negative electrode may be formed of only a negative electrode material mixture, and may be formed of a negative electrode current collector and a negative electrode material mixture layer supported thereon. Likewise, a positive electrode may be formed of only a positive electrode material mixture, and may be formed of a positive electrode current collector and a positive electrode material mixture layer supported thereon. In addition, the negative electrode material mixture and the positive electrode material mixture may further include a conductor, a binder, and the like.

As a material constituting the negative electrode current collector and a material constituting the positive electrode current collector, materials that are known in the art may be used, and as a binder and a conductor added to the negative electrode and the positive electrode, materials that are known in the art may be used.

In the case where the negative electrode is configured of a current collector and an active material layer supported thereon, the negative electrode may be manufactured by coating a surface of the current collector with a material mixture paste containing the silicon composite prepared in step (ii) and a carbon material, followed by drying.

A non-aqueous electrolyte may contain a non-aqueous solvent and a lithium salt dissolved in the non-aqueous solvent. As the non-aqueous solvent, a solvent that is generally used in the art may be used, and preferably an aprotic organic solvent may be used. As the aprotic organic solvent, cyclic carbonates, such as ethylene carbonate, propylene carbonate, and butylene carbonate, cyclic carbonic acid esters such as furanone, chain carbonates, such as diethyl carbonate, ethyl methyl carbonate, and dimethyl carbonate, chain ethers, such as 1,2-methoxy ethane, 1,2-ethoxy ethane, and ethoxy methoxy ethane, and cyclic ethers, such as tetrahydrofurane and 2-methyl tetrahydrofurane, may be used alone or in a mixture of two or more thereof.

Hereinafter, examples of the present invention will be described in detail.

<Example 1> Preparation of Magnesium-Containing Silicon Oxide Composite 15 kg of a mixture powder, in which a silicon powder and a silicon dioxide ($SiO_2$) powder were uniformly mixed at a mole ratio of 1:1, and 1.5 kg of magnesium were thermally treated at 1,400° C. under a reduced pressure atmosphere of 0.01-1 torr to simultaneously generate a silicon oxide vapor, which is contained in the silicon oxide mixture powder, and a magnesium vapor, followed by reaction in a gas phase, cooling at 800° C., precipitation, and pulverization using a jet mill, thereby collecting a magnesium-containing silicon oxide composite powder having an average particle diameter ($D_{50}$) of 4 µm.

The collected silicon oxide composite powder was subjected to CVD treatment using a tube type electric furnace in conditions of 1,000° C. and 2 hours under a mixture gas of argon (Ar) and methanol ($CH_4$), thereby preparing a magnesium-containing silicon oxide composite (sample 1) with a carbon coating layer having a carbon content of 5 wt %.

As a result of inductively coupled plasma atomic emission spectroscopy (ICP-AES) analysis of the magnesium-containing silicon oxide composite (sample 1), the magnesium concentration was confirmed to be 9 wt %, and as a result of X-ray diffraction analysis (CuKα), the size of silicon crystals was confirmed to be 9 nm.

<Example 2> Preparation of Magnesium-Containing Silicon Oxide Composite

A magnesium-containing silicon oxide composite (sample 2) was prepared by the same method as in example 1, except that the injection amount of magnesium was increased to 2.5 kg in example 1 above.

As a result of inductively coupled plasma atomic emission spectroscopy (ICP-AES) analysis of the magnesium-containing silicon oxide composite (sample 2), the magnesium concentration was confirmed to be 14.6 wt %, and as a result of X-ray diffraction analysis (CuKα), the size of silicon crystals was confirmed to be 15 nm.

<Comparative Example 1> Preparation of Silicon Oxide

A silicon powder and a silicon dioxide ($SiO_2$) powder were uniformly mixed at a mole ratio of 1:1, and then thermally treated at 1,400° C. under a reduced pressure atmosphere of 0.01-1 torr to generate a silicon oxide vapor, followed by reaction in a gas phase, cooling at 800° C., precipitation, and pulverization using a jet mill, thereby collecting a silicon oxide powder (sample 3) having an average particle diameter ($D_{50}$) of 4 µm.

The collected silicon oxide powder was subjected to CVD treatment using a tube type electric furnace in conditions of 1,000° C. and 2 hours under a mixture gas of argon (Ar) and methanol ($CH_4$), thereby preparing a silicon oxide (sample 3-1) with a carbon coating layer having a carbon content of 5 wt %.

As a result of X-ray diffraction analysis (CuKα) of the silicon oxide (sample 3-1), the size of silicon crystals was confirmed to be 5 nm.

<Comparative Example 2> Preparation of Silicon Oxide

The silicon oxide powder (sample 3) collected in comparative example 1 was subjected to CVD treatment using a tube type electric furnace in conditions of 1,100° C. and 2 hours under a mixture gas of argon (Ar) and methanol (CH$_4$), thereby preparing a silicon oxide (sample 4) with a carbon coating layer having a carbon content of 5 wt %.
As a result of X-ray diffraction analysis (CuKα) of the silicon oxide (sample 4), the size of silicon crystals was confirmed to be 7 nm.

<Comparative Example 3> Preparation of Aluminum-Containing Silicon Oxide Composite The silicon oxide (sample 3-1) prepared in comparative example 1 and an aluminum powder having an average particle diameter of 2 μm were mixed, followed by heat treatment at 700° C., thereby preparing an aluminum-containing silicon oxide composite (sample 5).
As a result of inductively coupled plasma atomic emission spectroscopy (ICP-AES) analysis of the aluminum-containing silicon oxide composite (sample 5), the aluminum concentration was confirmed to be 10 wt %, and as a result of X-ray diffraction analysis (CuKα), the size of silicon crystals was confirmed to be 45 nm.

Figure 1:
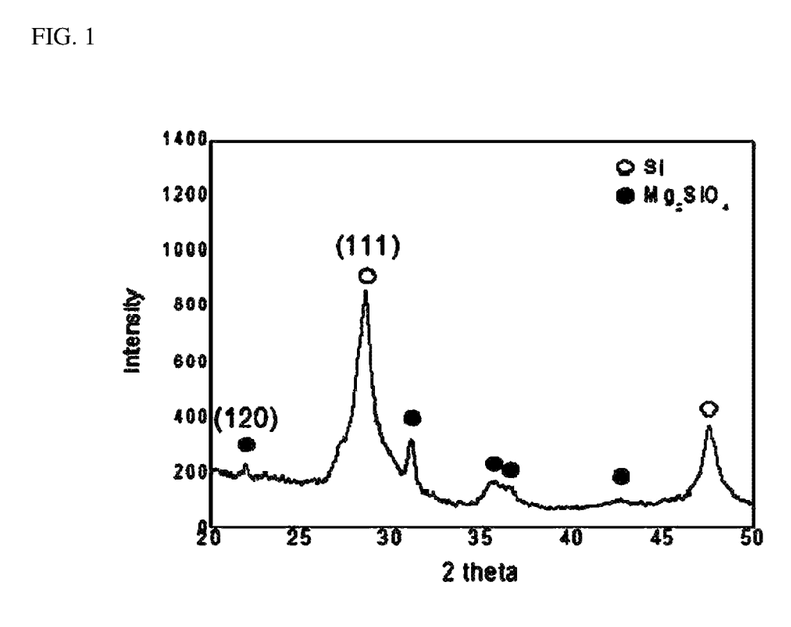
FIG. 1 shows an X-ray diffraction pattern of a silicon oxide composite according to example 1 of the present invention.
Figure 2:
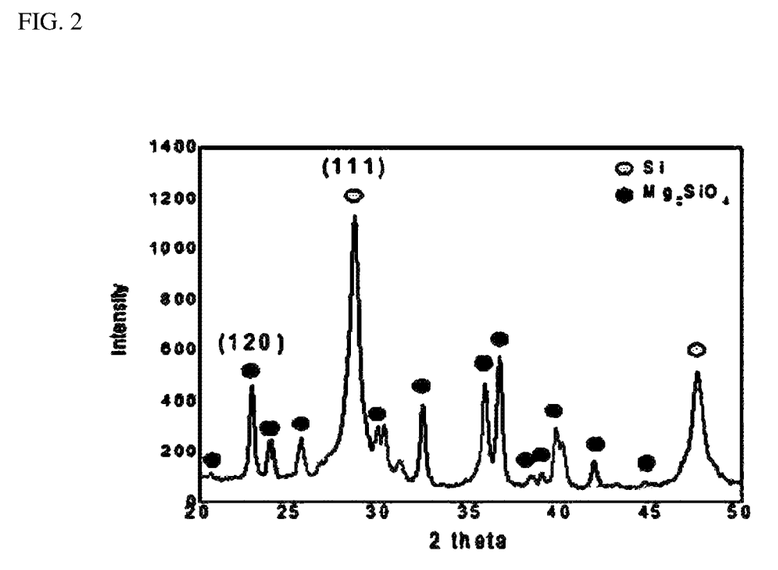
FIG. 2 shows an X-ray diffraction pattern of a silicon oxide composite according to example 2 of the present invention.
Figure 3:
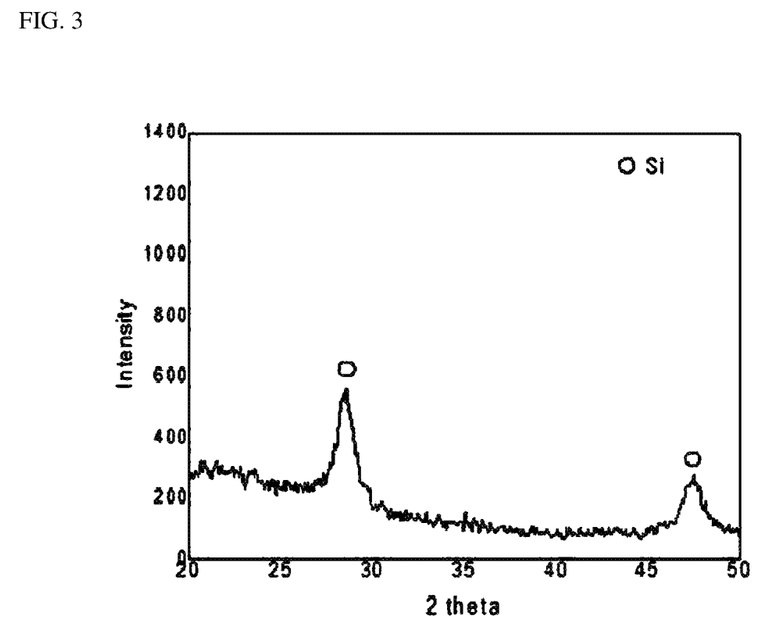
FIG. 3 shows an X-ray diffraction pattern of a silicon oxide composite according to comparative example 2 of the present invention.

<Test Example 1> Analysis of Ratio of Intensity of Diffraction Peak by X-Ray Diffraction Analysis X-ray diffraction analysis results of the samples prepared in examples 1 and 2 were shown in FIGS. 1 and 2.
In addition, the relative ratio between the intensity of a diffraction peak belonging to Si (111), $I_{Si(111)}$, and the intensity of a diffraction peak belonging to Mg$_2$SiO$_4$ (120) $I_{Mg2SiO4(120)}$ was calculated, and tabulated in table 1 below.

TABLE 1

|  | Example 1 (sample 1) | Example 2 (sample 2) |
|---|---|---|
| XRD intensity ratio $I_{Mg2SiO4(120)}/I_{Si(111)}$ | 0.1 | 0.4 |

<Manufacturing Example> Manufacturing of Coin Cell

A slurry type composition was prepared by mixing samples 1 to 5, which were prepared in examples 1 and 2 and comparative examples 1 to 3, as a negative electrode active material, Super-P-black as a conductor, and polyacrylic acid (PAA) as a binder, at a weight ratio of 80:10:10, with N-methyl pyrrolidone.
The composition was coated and dried on a 18 μm-thick copper foil, thereby forming a 30 μm-thick active material layer on one surface of the copper foil, and the active material layer was punched into a circle with a diameter of 14φ, thereby forming an electrode for testing. A metal lithium foil with a thickness of 0.3 mm was used as a counter electrode.
A porous polyethylene sheet with a thickness of 0.1 mm was used as a separator, and a solution, in which LiPF$_6$ as a lithium salt was dissolved at a concentration of about 1 mol/L in a mixture solvent of ethylene carbonate (EC) and diethylene carbonate (DEC) (1:1 volume ratio), was used as an electrolyte. These components were placed in a stainless container, and then a coin cell having a general shape with a thickness of 2 mm and a diameter of 32 mm (so called Form 2032) was manufactured.

<Test Example 2> Evaluation on Battery Characteristics

The coin cell manufactured for each sample in the above preparative examples was charged with a static current of 0.05 C to reach a voltage of 0.01 V, and discharged with a static current of 0.05 C to reach a voltage of 1.5 V, thereby obtaining discharging capacity and initial efficiency.
In addition, the coin cell manufactured for each sample in the above preparative examples was charged with a static current of 0.2 C to reach a voltage of 0.01 V, and discharged with a static current of 0.2 C to reach a voltage of 1.5 V, thereby obtaining cycle characteristics after one cycle of charge/discharge.
The charging capacity, initial efficiency, and cycle characteristics were calculated as below, and the results were tabulated in table 2 below.
Initial discharging capacity: 1$^{st}$ discharging capacity Initial efficiency: 100×(1$^{st}$ cycle discharging capacity)/(1$^{st}$ cycle charging capacity)

Capacity retention ratio: 100×(30$^{th}$ cycle discharging capacity)/(30$^{th}$ cycle discharging capacity)

TABLE 2

|  | Mg content (wt %) | Al content (wt %) | Si crystal size (nm) | XRD intensity $I_{Mg2SiO4(120)}/I_{Si(111)}$ | Discharge capacity (mAh/g) | Initial efficiency (%) | Capacity retention ratio (%) |
|---|---|---|---|---|---|---|---|
| Example 1 (sample 1) | 9.0 | 0 | 9 | 0.3 | 1346 | 80.7 | 87 |
| Example 2 (sample 2) | 14.6 | 0 | 15 | 0.3 | 1333 | 83.4 | 83 |
| Comparative Exam 1 (sample 3-1) | — | 0 | 5 | — | 1480 | 72.1 | 88 |
| Comparative Exam 2 (sample 4) | — | 0 | 7 | — | 1559 | 74.3 | 85 |
| Comparative Exam 3 (sample 5) | — | 10 | 45 | — | 1309 | 80.8 | 64 |

As shown in table 2 above, it was verified that the coin cell batteries containing sample 1 and sample 2 using the magnesium-containing silicon oxide composite as a negative electrode active material had an improved initial charge and discharge efficiency and a high capacity retention ratio.

In addition, it was verified that, in the coin cell batteries using the silicon oxide ($SiO_x$) of samples 3-1 and 4, compared with samples 1 and 2, as a negative electrode active material, the capacity retention ratio was high, but the initial charge and discharge efficiency was less than 75%.

Meanwhile, it was verified that, in the coin cell battery using the aluminum-containing silicon oxide composite prepared in sample 5 as a negative electrode, the initial efficiency was improved, but at the time of charge and discharge, the disproportionation reaction proceeds to cause a rapid growth of silicon crystals, resulting in an unstable structure, and thus the capacity retention ratio was remarkably low.

The foregoing description of the invention is for illustrative purposes, and a person having ordinary skilled in the art will appreciate that other specific modifications can be easily made without departing from the technical spirit or essential features of the invention. Therefore, the foregoing examples should be regarded as illustrative rather than limiting in all aspects. For example, some components, each of which has been described as being a single form, can be embodied in the distributed form, whereas some components, which have been described as being distributed, can be embodied in the combined form.

The scope of the present invention is not defined by the detailed description as set forth above but by the accompanying claims of the invention, and it should also be understood that all changes or modifications derived from the definitions and scopes of the claims and their equivalents fall within the scope of the invention.

INDUSTRIAL APPLICABILITY

According to the negative electrode active material for a non-aqueous electrolyte rechargeable battery, containing a silicon oxide composite, of the present invention, a non-aqueous electrolyte rechargeable battery can be manufactured that has a high battery capacitance and improved cycle characteristics and charge and discharge efficiency, and is applicable in the field of rechargeable battery industry.

ADVANTAGEOUS EFFECTS

According to the negative electrode active material for a non-aqueous electrolyte rechargeable battery, including a silicon oxide composite, a non-aqueous electrolyte rechargeable battery can be manufactured that has high battery capacity, and improved cycle characteristics and charge and discharge efficiency.

The effect of the present invention is not limited to the above-described effects, but it should be understood that the present invention includes all of the effects which can be deduced from the configuration of the present invention described in the detailed description or claims of the present invention.

What is claimed is:

1. A negative electrode active material for a non-aqueous electrolyte rechargeable battery, comprising a silicon oxide composite, the silicon oxide composite containing i) silicon, ii) a silicon oxide represented by general formula $SiO_x$ (0<x<2), and iii) an oxide including silicon and Mg,
wherein the silicon oxide composite exhibits at least one diffraction peak in each of the ranges of 27° to 32° and 21° to 23.5°, in the X-ray diffraction analysis, and
wherein there is no peak by $SiO_2$ in the X-ray diffraction analysis.

2. The negative electrode active material of claim 1, wherein the oxide including silicon and M is $Mg_2SiO_4$.

3. The negative electrode active material of claim 1, wherein, in the X-ray diffraction analysis of the silicon oxide composite, the range of the relative ratio between the intensity of a diffraction peak belonging to Si (111), $I_{Si(111)}$, and the intensity of a diffraction peak belonging to $Mg_2SiO_4$ (120), $I_{Mg2SiO4(120)}$, is $0<I_{Mg2SiO4(120)}/I_{Si(111)}<1.0$.

4. The negative electrode active material of claim 1, wherein the size of silicon crystals contained in the silicon oxide composite, which is determined by Scherrer equation on the basis of the full width at half maximum (FWHM) of the diffraction peak of Si (111) in the X-ray diffraction analysis, is 1-50 nm.

5. The negative electrode active material of claim 1, wherein the average particle diameter ($D_{50}$) of the silicon oxide composite is 0.1-20 µm.

6. The negative electrode active material of claim 1, wherein the specific surface area of the silicon oxide composite is 1-50 $m^2/g$.

7. The negative electrode active material of claim 1, further comprising a coating layer or deposition layer containing a carbon-based material on a surface of the silicon oxide composite.

8. The negative electrode active material of claim 7, wherein the content of the carbon-based material is 1-20 parts by weight on the basis of 100 parts by weight of the silicon oxide composite.

9. A negative electrode active material for a non-aqueous electrolyte rechargeable battery, comprising a silicon oxide composite, the silicon oxide composite containing i) silicon, ii) a silicon oxide represented by general formula $SiO_x$ (0<x<2), and iii) an oxide including silicon and Mg,
wherein the silicon oxide composite exhibits at least one diffraction peak in each of the ranges of 27° to 32° and 21° to 23.5°, in the X-ray diffraction analysis, and
wherein there is no peak by $SiO_2$ in the X-ray diffraction analysis;
wherein the negative electrode active material is manufactured by the method comprising:
(i) simultaneously injecting a silicon oxide powder and Mg into a reactor, the silicon oxide powder being obtained by mixing silicon and silicon dioxide ($SiO_2$) powders to have a mole ratio of 1:0.5 to 1:1.5, the mole ratio of the silicon and Mg being 1:0.01 to 1:1;
(ii) heating the silicon oxide powder and Mg at 1,000-1,800° C., followed by cooling at 500-900° C., to precipitate a silicon oxide composite; and
(iii) pulverizing the precipitated silicon oxide composite to an average particle diameter of 0.1-20 µm.

* * * * *